Dec. 5, 1967     M. A. RUSZCZYCKY ETAL     3,356,150
MECHANISM FOR DEFLECTION OF A CONTRA-ROTATING PROPELLER SYSTEM
Filed April 27, 1967     2 Sheets-Sheet 1

INVENTORS.
MARK A. RUSZCZYCKY
WILLIAM A. MIDDLETON
BY
   MICHAEL F. OGLO
   ROY MILLER
ATTORNEYS.

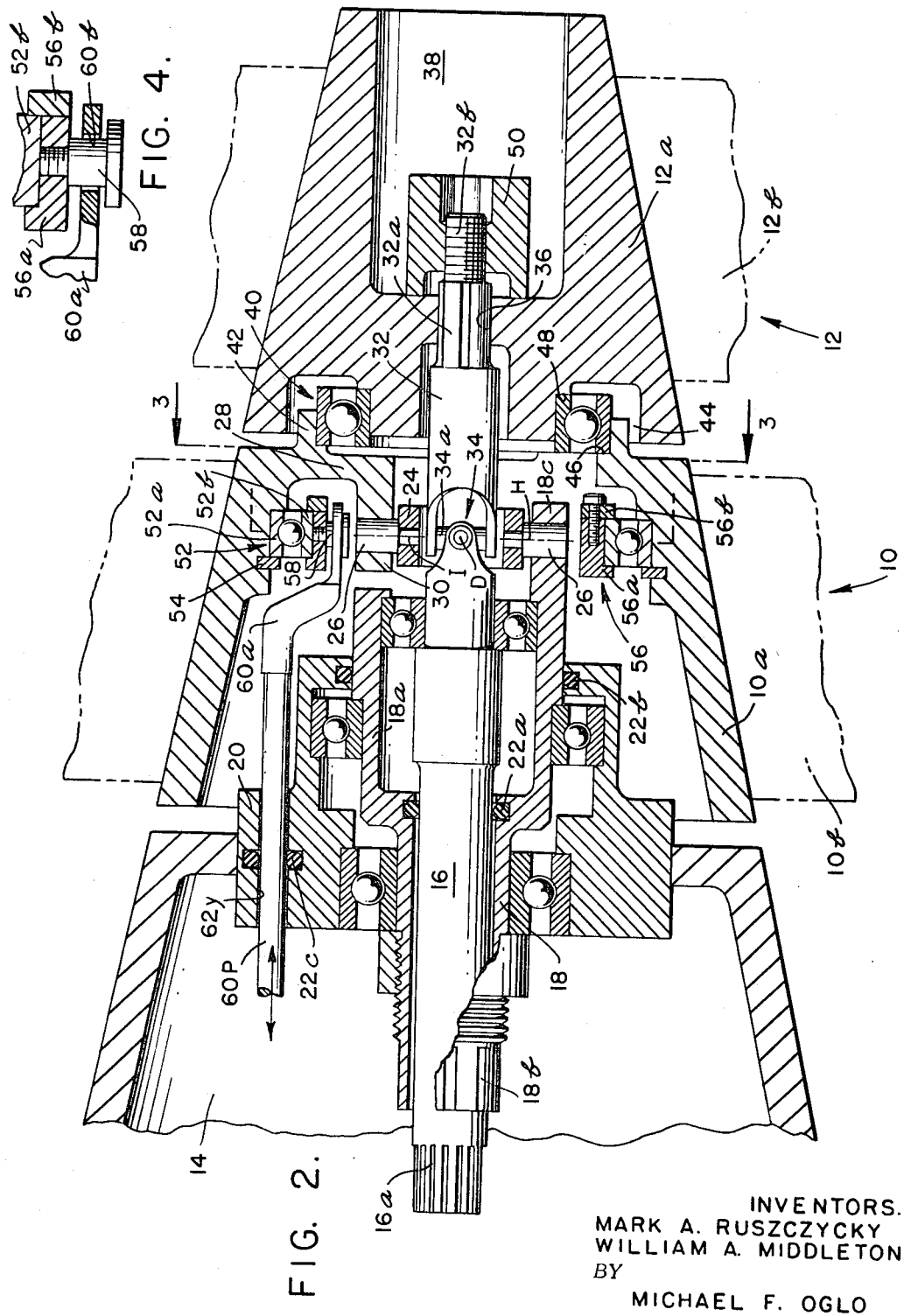

United States Patent Office 3,356,150
Patented Dec. 5, 1967

3,356,150
MECHANISM FOR DEFLECTION OF A CONTRA-ROTATING PROPELLER SYSTEM
Mark A. Ruszczycky, Newport Beach, Calif., and William A. Middleton, Corvallis, Oreg., assignors to the United States of America as represented by the Secretary of the Navy
Filed Apr. 27, 1967, Ser. No. 635,331
3 Claims. (Cl. 170—135.26)

ABSTRACT OF THE DISCLOSURE

A contra-rotating torpedo propeller system is selectively deflectable with respect to the torpedo axis in order to provide turning moments for stabilization and steering control. A pair of propellers have their hubs journaled for contra-rotation about a common axis, and are connected to inner and outer concentric drive shafts by a system of two concentric universal joints having a common universal pivot point located at the "effective center of lift" of the propeller system. The hub of the front propeller is hollow and this hub structure is connected to the outer drive shaft by a gimbal ring type U-joint, which is the outer U-joint of the system of concentric U-joints. The inner drive shaft is connected to a rearward shaft extension by the other U-joint of the system which is disposed within the ring of the gimbal ring type U-joint. The rear hub is secured to the rearward shaft extension. A ball bearing assembly ring has its outer race secured to the interior surface of the wall of the front hub, and is axially positioned in a transverse plane through the effective center of lift point. A non-rotating gimbal ring is rigidly secured to the inner track of the ball bearing. The ball bearing ring serves as the support for the non-rotating gimbal ring which secures the hub and the non-rotating gimbal together for joint deflection about the center of lift point in planes through the common axis of rotation, but which permits the hub to freely rotate about such common axis relative to the non-rotating gimbal. A pair of linear actuator rods are pivotally pinned to the non-rotating gimbal at orthogonally disposed pivot points, and serve to selectively tilt the non-rotating gimbal ring, and in turn deflect the entire propeller assembly in transverse deflection planes.

---

The invention described herein may be manufactured and used by or for the Government of the United States of America for governmental purposes without the payment of any royalties thereon or therefor.

This invention relates to a torpedo which is steered and stabilized by deflection of contra-rotating propellers, and more particularly to an improvement in the mechanism for controlling deflection of the propeller system.

The invention is in some respects an improvement upon the invention of T. G. Lang, U.S. Patent 3,140,685 entitled "Propeller Stabilized and Controlled Torpedoes." A few of the limitations of the mechanism for controlling propeller system deflection disclosed therein may be briefly noted. That mechanism used a pivot point forward of the propeller system, and as a result relatively large forces were required to deflect the shaft and propeller system. Also, that mechanism employed mobile rotating, and flexible seals which are expensive, difficult to install, and tends to be unreliable for deep water operation. Further, the structure of that mechanism inherently required allocation of a relative large axial length of the torpedo afterbody to house same, whereas minimizing the overall length of a torpedo is in many instances critically desired.

Accordingly, an object of the present invention is to provide an improved mechanism for deflection control of contra-rotating propellers, which enables the pivot point of deflection to be located at a point where the theoretical hinge moment is zero, and therefore the forces required to deflect the shaft and propeller system are minimum.

Another object is to provide an improved mechanism in accordance with the preceding objective, and further having a structure which is inherently easy to seal and which inherently provides a rugged and stable scheme of support for the weight of the propeller assembly.

A further object is to provide an improved propeller deflection control mechanism in which a major portion of the structure is housed within the hub structure of a propeller, and therefore does not occupy critical space within the body of the torpedo.

Other objects and many of the attendant advantages of this invention will be readily appreciated as the same becomes better understood by reference to the following detailed description when considered in connection with he accompanyting drawings wherein:

FIG. 2 is a composite view of two radial sections taken through the contra-rotating propellers taken along orthogonal section lines 2—2 of FIG. 3;

FIG. 4 is an enlarged detail of the arrangement for pinning the end of an actuator rod to a gimbal shown in FIG. 2.

Figure 1:
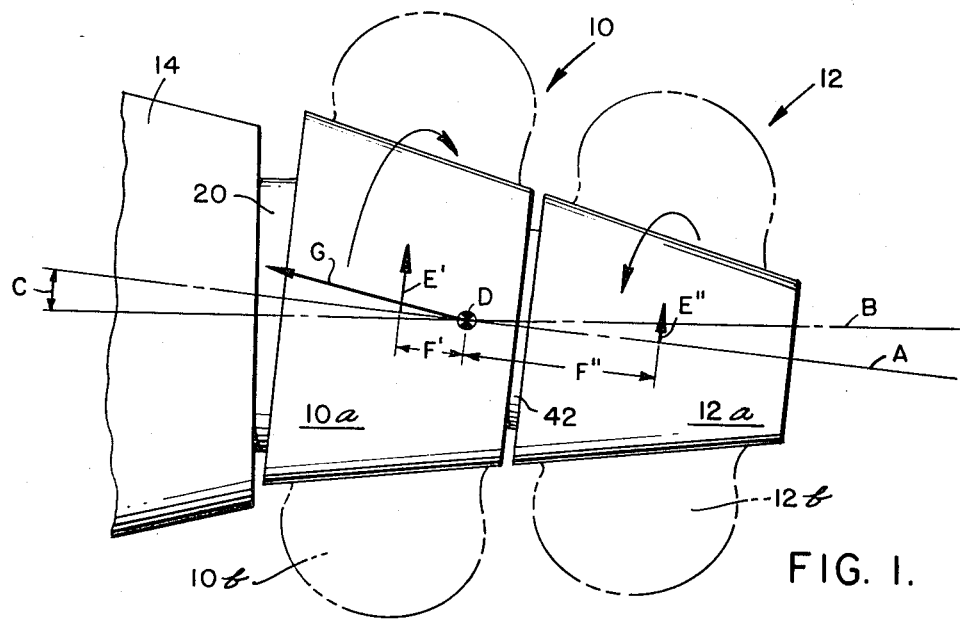
FIG. 1 is a diagrammatic side elevation of a deflectible contra-rotating propeller system, the angle of deflection shown being somewhat exaggerated.
Figure 3:
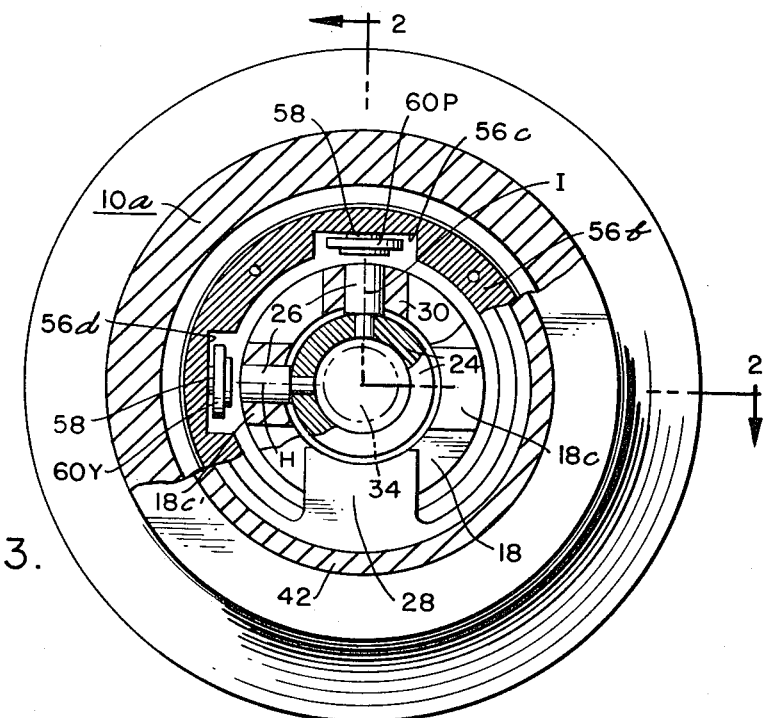
FIG. 3 is a transverse section through the propellers taken along section lines 3—3 of FIG. 2, certain portions being shown as an end elevation of the front hub, and detail at the center of the figure being omitted for clarity.

Referring now to the drawing, and in particular to FIG. 1, the subject of the invention is a system of two contra-rotating propellers 10 and 12, mounted at the rear end of a tapered torpedo afterbody 14. The propellers 10 and 12 have a common axis of rotation A, which is universally deflectable (in both pitch and yaw planes) with respect to the torpedo axis of symmetry B, in order to produce turning moments for steering and stabilizing the torpedo. This is illustrated in FIG. 1, wherein axis A is deflected with respect to axis B through a positive angle of deflection C (exaggerated). The details of the propeller drive mechanism and associated mechanism for deflecting the propellers are omitted from FIG. 1 for clarity in illustrating geometrical relationships. However, these mechanisms will be described in detail later in this specification with respect to FIGS. 2 and 3.

In accordance with the present invention the pivot point for the universal deflection of the system of propellers 10 and 12, is at a predetermined axial point D, which constitutes the effective center of lift of the system of propellers. This effective center of lift is a characteristic of the geometry and blade design of the propellers, as follows. In accordance with the well known theory, the force system acting on contra-rotating propellers having their axis deflected relative to the stream flow field, includes lateral lift forces E' and E" acting on the individual propellers in a direction perpendicular to the axis of rotation. As the result of complex factors, including the distortion of the flow stream caused by the front propeller before the flow stream reaches the rear propeller, these lift forces are not equal. The "effective center of lift" of a propeller system is that point along its axis which constitutes a center of moment about which the moments due to these unequal lift forces cancel one another. Stated another way, it is the location along the axis of rotation where the product of the front propeller lift E', and its moment arm F', equals the product of the rear propeller lift E" and its moment arm F". The term effective center of lift" is applied in describing this point because of the analogy to the use of the term "center of lift" in describing the corresponding point in the force system of a deflectable control surface or foil. Location of this point may be determined by conventional estimating techniques, combined with experimental verification as necessary. The propellers 10 and 12 illustrated in the drawing are of conventional basic configuration of the type having hubs 10a, 12a (solid lines) which continue the taper of the afterbody 14, and have substantially the same size of respective blade systems 10b, 12b (phantom lines). However, in comparison to a blade system solely for propulsion purposes, the blades are thicker, have larger planforms, are heavier in construction and protrude beyond the boundary layer. For this type of system of propellers the effective center of lift point D is approximately three-quarters along the length of the axis of the front propeller 10 in the rearward direction. For most systems of propellers having approximately equal blade system sizes for front and rear propellers, the point will be located along the rear half of the axis of the front propeller. The effective center of lift D is also the point at which the resultant force G (not in scale) of the propeller system acts. Force G is a combination of the propeller system's thrust force (not shown) along its axis of rotation, and the lateral lift forces E′, E″.

Referring now to FIGS. 1 and 2, inner and outer concentric drive shafts 16 and 18 are supported for contrarotation by means of a suitable ball bearing arrangement in a journal housing 20, which is affixed to the torpedo afterbody 14 at its rear end. Propeller hub 10a is hollow, and the journal housing and drive shaft project into the central space within this hub. An "O" ring 22a is disposed between the shaft 16 and 18 at the front end of expanded diameter portion 18a of the outer shaft, providing a rotating seal between the two drive shafts. Another "O" ring 22b is disposed along the exterior of the expanded diameter portion 18a of the outer shaft where it engages structure of the journal housing. The front ends of the drive shafts 16 and 18 are provided with splines 16a, 18b, for engagement with the prime mover. The primary mover may be of either of the two principal types of contrarotating drive arrangements for torpedoes. One of these types is the so-called free floating motor system in which the motor armature and motor case are not in any way coupled to the torpedo body, but instead are directly coupled to the contra-rotating drive shaft. The other type of arrangement is where the motor housing is affixed to the torpedo body, and contra-rotation is developed by gearing.

Two fork-like, diametrically aligned, drive shaft projections 18c and 18c′ are formed on the rear annular face of drive shaft 18 as an integral part thereof. (Because FIG. 2 is a section taken on orthogonal section lines, only 18c is shown therein. However, both 18c and 18c′ may be seen in FIG. 3.) Projection 18c and 18c′ have diametrically aligned apertures, and are pinned to a gimbal ring 24 by suitable pivot pins, illustrated as shoulder pins 26. The enlarged portions of the pins are force fitted into apertures in projections 18c, 18c′ and the smaller diametered inner ends of the pins rotatably engage a pair of diametrically opposed apertures through the gimbal ring. The pivot pins connecting projections 18c, 18c′ and gimbal ring 24 provide an axis of pivotal rotation H, which passes through effective center of lift point D. The front propeller hub 10a is provided with a pair of diametrically aligned inwardly projecting radial arms 28 at the rear end of the hub. A pair of forwardly extending projections 30 and 30′ (not shown) which are similar in shape to projections 18c and 18c′, are affixed to front face of these radial arms. The projections 30 are pinned to gimbal ring 24 by two more shoulder pins 26. The pivot pins connecting projections 30, 30′ and ring 24 provide an axis I of pivot rotation which also passes through point D, but is perpendicular to axis H. The construction composed of drive shaft projections 18c, 18c′, gimbal ring 24, projections 30, 30′, and the pivot pins 26, form a conventional gimbal ring type universal joint connecting the outer drive shaft 18 and propeller hub 10a.

The rear end of drive shaft 18 is forked and is connected to a similarly forked front end of a rearward extension shaft 32 by means of another universal joint 34. U-joint 34 is of the conventional type for connecting two forked ended shafts by means of a centrally disposed member 34a forming transverse axes of rotation through the respective forked ends. The axes of this U-joint also pass through effective center of lift point D, so that U-joint 34 and the previously described gimbal ring type joints are in concentric relationship to one another, and point D is their common universal pivot point. Extension shaft 32 has a splined mid-portion 32a, and a threaded rear end portion 32b. Rear hub 12a is provided with splined central aperture 36 which opens into the bottom of the cylindrical cavity or well 38 which extends into the hub from its rear face. Hub 12a is mounted on extension shaft 32 with the splined portion 32a of the shaft slideably engaging the spline aperture 36. The front face of hub 12a is journaled to the rear face of hub 10a for rotation about a common axis by a ball bearing 40, which serves as both a thrust and radial bearing. The outer track of bearing 40 engages a circular upstanding rim 42 formed on the rear face of hub 10a, and the inner ball track engages a lateral wall of an annular slot 44 formed in the front face of rear hub 12a. Small annular radial ledges 46 and 48 adjoin the lateral edges of the outer and inner ball tracks, respectively, in order to bear the thrust loads. The rear propeller hub 12a is secured to the threaded end portion 32b of extension shaft 32 by a cap nut 50. Nut 50 is tightened to bear against the bottom of cavity 38 and thereby preload ball bearing 40 and insure firm assembly.

The mechanism for selectively adjusting the deflection axis A of the system of propellers, in both pitch and yaw planes, will now be described. A ball bearing ring 52 has its outer ball track 52a secured to the interior surface of the wall of the hollow hub in any suitable manner, such as by a snap ring 54. The ball bearing ring is axially aligned through point D. A non-rotating gimbal ring 56 is rigidly secured to the inner race 52b of the ball bearing. It will be apparent that ball bearing 52 serves as a support for the non-rotating gimbal ring 56 which secures the hub 10a and the gimbal ring 56 together for joint deflection about point D in any plane through axis A, but which permits the hub to freely rotate about axis A relative to the non-rotating gimbal. As best shown in FIG. 4 taken in conjunction with FIG. 2, gimbal ring 56 is made as a two part assembly consisting of a body element 56a which has a small flange on its outer periphery at its front end, and a face plate 56b which is fastened to the rear face of the body element 56a by screws. When the gimbal is assembled, the gimbal ring is rigidly secured by the engagement to the lateral edges of the inner ring 52b by the flange on the body element 56a and the confronting surface of the face plate 56b. A pitch plane control actuator rod 60P and a yaw plane control actuator rod 60Y (shown in FIG. 3, where only an end elevation of its eye element is visible) provide rectilinear motion linkages for deflecting the gimbal ring 56 in the pitch and yaw planes, respectively. Rods 60P and 60Y lie in the central pitch and yaw planes of the torpedo, and extend through and slideably engage axial bores 62P and 62Y (not shown) in a flange of the journal housing 20. At its rear end, each rod carries a knee element 60a having an integral rearwardly projecting flat eye member containing an aperture 60b. The eye members are received in two cutaway zones 56c and 56d (FIG. 3) formed in the inner periphery of the non-rotating gimbal ring 56, and are pivotally pinned to the gimbal ring by shoulder screws 58. As shown in FIG. 4 the aperture 60b in each eye element is somewhat oversized relative to the diameter of the shoulder of screw 58, this construction enabling deflection of gimbal 56 without binding the pivot joint. An alternative to use of the oversized aperture would be the provision of suitable pin joints in the knee structure of the rod to allow same to articulate under deflection of the gimbal ring. Suitable linear actuators (not shown) within afterbody 14 control the linear displacement of rods 60P and 60Y in accordance with the pitch and yaw commands of the torpedo autopilot. An "O" ring 22c is disposed in the surface of the slide bores 62Y and 62P to provide a sliding seal and prevent leakage into the interior of the torpedo.

The operation of the deflection control mechanism in adjusting the angular position of the axis A of the system of propellers 10 and 12 may now be readily understood in light of the preceding description of the structure. The non-rotating gimbal ring 56 is selectively tilted under linear displacement of connector rods 60P and 60Y. The front hub 10a and the non-rotating gimbal ring 56 are secured together for joint deflection about point D in the pitch and yaw planes by means of ball bearing 52, as previously described. Therefore, the front hub will bodily move with the non-rotating gimbal ring under tilting of the latter. Further, since the rear hub 12a is journaled to the front hub 10a by ball bearing 40 for rotation about their common axis A, and since the universal pivot point for the U-joint 34 connecting inner drive shaft 16 and rear extension shaft 32 is also at point D, the rear hub 12b bodily moves together with the front hub. Contra-rotation of the propellers 10 and 12 under the drive torques applied by the inner and outer drive shaft continues independent of adjustment of deflection of the common axis of rotation of the hubs, since bearings 40 and 52 enable the hubs to rotate relative to the non-rotating gimbal and relative to each other.

An important feature of the invention is that the deflection control acts at the effective center of lift point D. The propeller system has a zero theoretical hinge moment about this point, and the power needed for deflection control is thus minimum.

Other features of the invention include good stability as the result of the use of the universal joint to support the weight of the propeller assembly (during its operation), and as the result of the rugged support of the drive shaft at portions adjoining the U-joints by journal housing 20. Also, the structure is inherently easy to seal against leakage since all moving parts which pass through the wall of the torpedo may be simply and reliably sealed by "O" rings. Further, since much of the universal joint and deflection control mechanism is contained in the space within the propeller hub structure itself, the structure takes up very little space within the body of the torpedo.

Obviously many modifications and variations of the present invention are possible in the light of the above teachings. It is therefore to be understood that within the scope of the appended claims the invention may be practiced otherwise than as specifically described.

What is claimed is:
1. In a torpedo, the combination, comprising:
(a) inner and outer contra-rotating propeller drive shafts,
(b) front and rear propellers and means for maintaining their respective hubs coaxially aligned about a common axis which allows contra-rotation therebetween, said propellers having a characteristic predetermined center of lift point along their common axis of rotation,
(c) the hub of the front propeller being hollow,
(d) the hub of the rear propeller having an axial drive shaft extension projecting forwardly into the hollow hub of the front propeller,
(e) co-axial inner and outer universal joints disposed in the hollow hub of the front propeller at said predetermined axial position for coupling the inner drive shaft to the drive shaft extension of the rear propeller and for coupling the outer drive shaft to the hub of the front propeller, respectively,
(f) universal deflection means for selectively bodily deflecting the front and rear propellers about said predetermined axial position in transverse steering planes.

2. Apparatus in accordance with claim 1,
(g) said universal deflection actuator means comprising a non-rotating deflection actuator gimbal ring rotatably mounted to the inner wall of the hollow hub of the front propeller and aligned in a plane transverse to the common axis of rotation of the propellers through said predetermined center of lift point, said deflection actuator gimbal ring carrying first and second inwardly projecting pivot pins affixed to its inner periphery and in orthogonally-spaced relation to each other, and,
(h) first and second axially aligned rectilinearly movable actuator rods projecting rearwardly into the hollow center of the front propeller hub, said actuator rods having apertured rear ends for receiving the first and second pivot pins.

3. Apparatus in accordance with claim 1;
(i) the outer universal joint being of the type comprising a universal joint gimbal ring and a first pivotal means for connecting the rear end of drive shaft to said universal joint gimbal ring about a first diametric axis of pivotal rotation through the gimbal ring and a second pivotal means for connecting the hub of the front propeller to said universal joint gimbal ring about a second diametric axis of pivotal rotation through the universal joint gimbal ring perpendicular to said first diametric axis, and
(j) the inner joint of the coaxial pair of universal joints being disposed within the central space in the gimbal ring of the outer universal joint.

References Cited

UNITED STATES PATENTS 2,658,575   11/1953   Stone _____ 170—135.26
3,140,685   7/1964   Lang _____ 170—135.26 X

FOREIGN PATENTS 957,314   5/1964   Great Britain.

EVERETTE A. POWELL, JR., *Primary Examiner.*